United States Patent

Inoue

(10) Patent No.: US 6,482,767 B2
(45) Date of Patent: Nov. 19, 2002

(54) PHOTOCATALYSTS MADE BY USING OXIDES CONTAINING METAL IONS OF $D^{10}$ ELECTRONIC STATE

(75) Inventor: Yasunobu Inoue, Nagaoka (JP)

(73) Assignee: Japan Science & Technology Corporation, Saitama (JP)

( * ) Notice: Subject to any disclaimer, the term of this patent is extended or adjusted under 35 U.S.C. 154(b) by 0 days.

(21) Appl. No.: 10/089,729

(22) PCT Filed: Aug. 3, 2001

(86) PCT No.: PCT/JP01/06702

§ 371 (c)(1),
(2), (4) Date: Apr. 4, 2002

(87) PCT Pub. No.: WO02/13965

PCT Pub. Date: Feb. 21, 2002

(65) Prior Publication Data

US 2002/0155948 A1 Oct. 24, 2002

(30) Foreign Application Priority Data

Aug. 14, 2000 (JP) ......................................... 2000-245690

(51) Int. Cl.[7] .......................... B01J 23/40; B01J 23/42; B01J 23/58; B01J 23/60; B01J 23/56
(52) U.S. Cl. ...................... 502/326; 502/327; 502/328; 502/329; 502/330; 502/332
(58) Field of Search .................. 502/326, 327, 502/328, 329, 330, 332

(56) References Cited

U.S. PATENT DOCUMENTS

| | | | | |
|---|---|---|---|---|
| 5,277,844 A | * | 1/1994 | Rainey | 252/518 |
| 5,318,937 A | * | 6/1994 | Jovanovic et al. | 502/303 |
| 5,338,488 A | * | 8/1994 | Choudhary et al. | 252/373 |
| 5,411,927 A | * | 5/1995 | Choudhary et al. | 502/302 |
| 5,756,421 A | * | 5/1998 | Choudhary et al. | 502/328 |
| 5,851,506 A | * | 12/1998 | Zheng et al. | 423/592 |
| 5,868,913 A | * | 2/1999 | Hodgson | 204/298.01 |
| 5,969,166 A | * | 10/1999 | Scharbert et al. | 549/512 |
| 6,203,692 B1 | * | 3/2001 | Sarangapani et al. | 205/763 |
| 6,352,955 B1 | * | 3/2002 | Golden | 502/302 |

FOREIGN PATENT DOCUMENTS

| | | |
|---|---|---|
| JP | 7-88370 | 4/1995 |
| JP | 2000-189806 | 7/2000 |
| JP | 2000-202303 | 7/2000 |

OTHER PUBLICATIONS

J. Sato, "New Photocatalyst Group for Water Decomposition of RuO2–Loaded p–Block Metal (In, Sn, and Sb) Oxides With d–10 Configuration", Journal of Physical Chemistry B, Jul., 2001, vol. 105, No. 26, pp. 6061–6063.

* cited by examiner

*Primary Examiner*—Stanely S. Silverman
*Assistant Examiner*—Cam N. Nguyen
(74) *Attorney, Agent, or Firm*—Sherman & Shalloway (57) ABSTRACT

A photo-catalyst comprising $RuO_2$-loaded $A_2X_nO_m$ or $RuO_2$-loaded $BX_nO_m$ (wherein A is an alkali metal atom, B is an alkali earth metal atom or Zn, X is a metal ion with $d^{10}$ configuration, n=m/2 or n=m/3 and n is 2), and especially relates to a photo-catalyst for complete photo decomposition reaction of water.

7 Claims, 10 Drawing Sheets

PHOTOCATALYSTS MADE BY USING OXIDES CONTAINING METAL IONS OF $D^{10}$ ELECTRONIC STATE

FIELD OF THE INVENTION

The present invention relates to a novel photo-catalyst. Especially, the present invention relates to a photo-catalyst comprising $RuO_2$-loaded $A_2X_nO_m$ or $RuO_2$-loaded $BX_nO_m$ (wherein A is an alkali metal atom, B is an alkali earth metal atom or Zn, X is a metallic ion with $d^{10}$ configuration, n=m/2 or n=m/3 and n is 2), more especially relates to a photo-catalyst used for complete decomposition of water.

BACKGROUND OF THE INVENTION

The photo decomposition reaction of water is broadly interested from the view point of photo energy transformation. While, a photo-catalyst which shows activity to the photo decomposition reaction of water can be considered to be a high quality photo functional material possessing functions such as photo absorption, electric charge separation or surface oxidation-reduction reaction.

Kudo, Kato et al are explaining that alkali tantalate or alkali earth elements are the photo-catalyst showing high activity to the complete photo decomposition reaction of water by quoting various prior arts [Catal. Lett., 58(1999). 153–155, Chem. Lett., (1999), 1207, Surface Vol.36, No.12 (1998), 625–645 (shortened to document A)].

In above mentioned document A, there is an explanation about an useful photo-catalyst materials for proceeding the decomposition reaction of water to hydrogen and oxygen using a photo-catalyst, and many indications about photo-catalyst used for complete photo decomposition reaction of water are mentioned.

In the document, it is reported that the authors has first at all found, that tantalate acts as a photo-catalyst which generates oxygen and hydrogen from pure water according to stoichiometric ratio without a promoter, and then has found that the catalyst activity is remarkably improved by carrying NiO promoter (right column of $635^{th}$ page).

Further, there is an explanation reporting that also $K_4Nb_6O_{17}$ can generate oxygen and hydrogen from pure water without a promoter, and the fine crystalline of it obtained by pulverizing it indicates remarkably high activity. Furthermore, there is an illustration that a compound having perovskite structure such as $K_2La_2Ti_3O_{10}$ has excellent photo-catalyst activity, because the hydration reaction can easily occur between layers.

In FIG. 6 of $629^{th}$ page, there is an explanation about main elements composing of un-uniform type photo-catalyst materials, and in which there is a description explaining that the oxide composed of a transition metal ion possessing $d^0$ and $d^{10}$ electron arrangement or a metal ion of p-block. And, in $640^{th}$ page, following explanations are described. Namely, the band gap of $In_2O_3(ZnO)_m$ composed of laminated structure of $In_2O$ and $ZnO_3$ is smaller than that of $In_2O_3$ or ZnO alone, and generates hydrogen by photo decomposition of methanol aqueous solution under the visible radiation or generates oxygen by photo decomposition of $AgNO_3$ aqueous solution under the visible radiation. Further, regarding to $\beta$-$Ga_2O_3$, there is also following explanation. Namely, by forming a solid solution with $In_2O_3$, the band gap of it becomes smaller maintaining the structure of $\beta$-$Ga_2O_3$, and can generate hydrogen and oxygen by photo decomposition of water under the presence of methanol or $AgNO_3$ which are a sacrificial reagent, but not extends to the responsibility for visible radiation. However, there is no explanation teaching activity in regard to water decomposition reaction or Sb.

Concerning above mentioned circumstances, the inventors of the present invention have carried out intensive study to make the photo-catalyst which uses a transition metal ion possessing $d^{10}$ electron arrangement generate high activity, especially have repeatedly continued various experiments in regard to various compounds aiming to provide a catalyst which make enable the photo decomposition of water.

From the results conduced by these experiments, the inventors of the present invention have found the following fact and have accomplished the present invention. That is, the salt of alkali metal or alkali earth metal and transition metal ion possessing $d^{10}$ electron arrangement can act as a catalyst which make enable the complete photo decomposition of water by loading $RuO_2$, without the presence of methanol or $AgNO_3$ which are a sacrificial reagent used in above mentioned prior arts.

DISCLOSURE OF THE INVENTION

The present invention is the photo-catalyst comprising $RuO_2$-loaded $A_2X_nO_m$ or $RuO_2$-loaded $BX_nO_m$ (wherein A is an alkali metal atom, B is an alkali earth metal atom or Zn, X is a metal ion with $d^{10}$ configuration, n=m/2 or n=m/3 and n is 2). Desirably, $A_2X_nO_m$ or $BX_nO_m$ (wherein A is an alkali metal atom, B is an alkali earth metal atom or Zn, X is a metal ion with $d^{10}$ configuration, n=m/2 or n=m/3 and n is 2) is the photo-catalyst obtained by a coprecipitation powder calcination method calcined at the temperature of 1150 to 1200° C., more desirably, X is In, Ga or Sb, an alkali metal atom is Na, K or Rb and an alkali earth metal atom is Ca, Sr or Ba.

The second important point of the present invention is the photo-catalyst for photo decomposition reaction of water comprising $RuO_2$-loaded $A_2X_nO_m$ or $RuO_2$-loaded $BX_nO_m$ (wherein A is an alkali metal atom, B is an alkali earth metal atom or Zn, X is a metal ion with $d^{10}$ configuration, n=m/2 or n=m/3 and n is 2).

THE BEST EMBODIMENT TO CARRY OUT THE INVENTION

The present invention will be illustrated more in details. The method for preparation of indate of $RuO_2$-loaded alkali earth is described hereinafter. The similar method can be applied for the preparation of indate of alkali metal and Zn and for the preparation of Ga salt or Sb salt of alkali metal, alkali earth metal and Zn.

I. Preparation Method of a Photo-Catalyst a. The preparation of alkali earth indate is; alkali earth metal carbonate and indium oxide are mixed by prescribed molar ratio and calcined by the temperature of 1000° C. in the atmosphere for 16 hours (called as a oxide calcination method), or, b. In the ethanol solution containing alkali earth metal nitrate and indium nitrate by prescribed molar ratio, ethanol solution of oxalic acid is dropped and obtain white sediment. After said sediment is heated at the temperature of 80° C., cooled down and filtrated then the filtrated product is calcined by the temperature of 900–1300° C. for 16 hours (coprecipitation powder calcination method) (the calcination time can be adjusted concerning calcination temperature).

Figure 1:
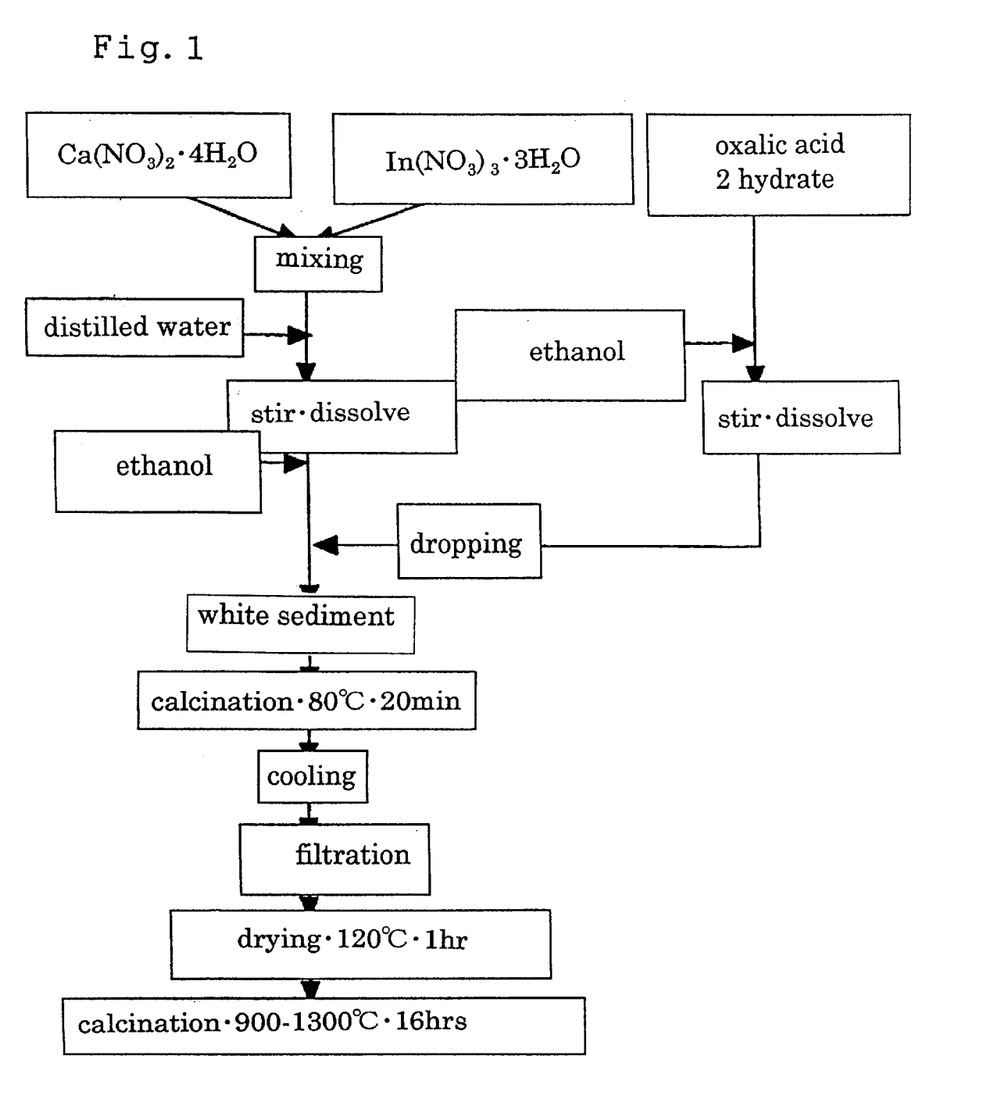
FIG. 1 is the flow chart illustrating the preparation method of $CaIn_2O_4$ at the preparing process of $RuO_2$-loaded $CaIn_2O_4$ photo-catalyst.
Figure 2:
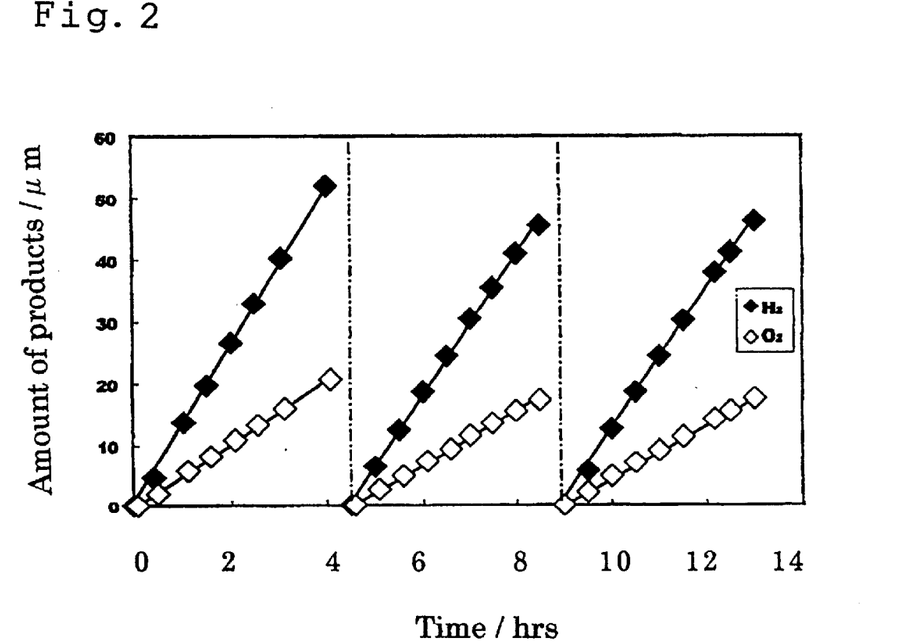
FIG. 2 is the graph showing the complete decomposition characteristic of water by $RuO_2$-loaded $CaIn_2O_4$ photo-catalyst.

The flow chart showing $CaIn_2O_4$ preparation process by coprecipitation powder calcination method is shown in FIG. 1.

In regard to $RuO_2$ loading, by penetrating method using THF (tetrahydrofurane) solution of $Ru_3(CO)_{12}$, which is a carbonyl complex, or aqueous solution of ruthenium chloride $RuCl_3$, ruthenium metal is carried on indium salt so as the wt % of Ru in photo-catalyst to be 0.25 to 2.0 wt % and make Ru to $RuO_2$ by heating it to 400° C., thus the photo-catalyst is prepared.

II. The Measuring Method of Complete Water Decomposition Characteristics of the Photo-Catalyst.

For the measurement of activity of photo-catalyst reaction, a closed circulation type reaction apparatus composed of vacuum part, reaction part and analysis part. Generated gases from photo complete decomposition reaction of water are circulated with Ar of 100 torr previously added to the reaction circulation apparatus during the reaction using a piston pump, and the generated gases are analyzed from time to time by a gas chromatography which is directly connected to the reaction part.

0.25 g of photo-catalyst powder is poured into a vertical reactor made of quartz and suspended by pure water prepared by further deionization of distilled water. The stirring of the photo-catalyst is carried out by bubbling of Ar of 100 torr pressure added in the reaction circulation apparatus. As the photo radiation, 500WXe lamp light (wave length range; from 260 nm to 600 nm) or Hg-Xe lamp light (wave length range; from 248 nm to 436 nm) are used.

EXAMPLE 1

Photo-catalyst activity of $RuO_2$-loaded $CaIn_2O_4$ $RuO_2$-loaded $CaIn_2O_4$ photo-catalyst is prepared by calcined temperature of 1000–1300° C. The obtained compound is analyzed by an X-ray diffraction method. The main peaks appear at $2\theta=18°$, $33°$, $48°$ and $58°$, and the highest peak appears at $2\theta=33°$, which indicates a diffraction pattern properly corresponding to a diffraction pattern described in JSPD card (17–643).

The calcined temperature is changed to 1150° C. and 1 wt % of $CaIn_2O_4$ carrying $RuO_2$ is obtained. Then the obtained $RuO_2$-loaded $CaIn_2O_4$ is used so that the activity of photo-catalyst and the change of the activity with the passage of time is measured using a closed circulation type reaction apparatus described in paragraph II. Since a generation test apparatus is a closed system, gaseous hydrogen and oxygen are discharged. Said discharging operation is repeated for three times, and the change of activity is investigated. By the investigation, it becomes clear that the activity of catalyst maintains the initial feature after 13 hours of total reaction time.

Figure 3:
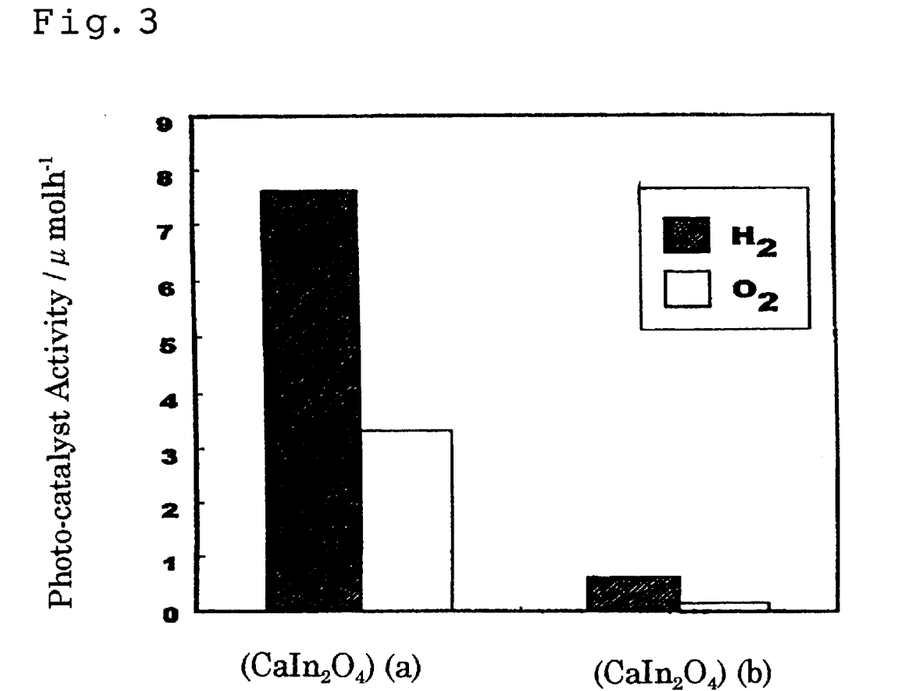
FIG. 3 is the graph showing the difference of $CaIn_2O_4$ preparation methods, a coprecipitation powder calcination method (a) and an oxide calcination method (b), further showing the relationship with activity of catalyst when they are used for the preparation of photo-catalyst.

In FIG. 3, the activity of $RuO_2$-loaded $CaIn_2O_4$ photo-catalysts prepared by a coprecipitation powder calcination method (a) and an oxide calcination method (b) are indicated in comparison. From this graph, it becomes clear that the photo-catalysts prepared by a coprecipitation powder calcination method (a) shows 14 times higher activity than that of the photo-catalysts prepared by method (b).

Figure 4:
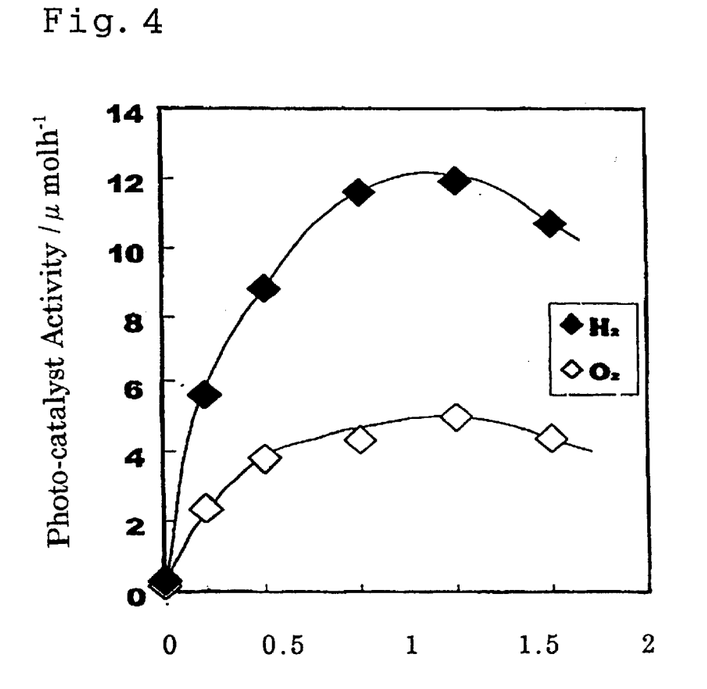
FIG. 4 is the graph showing the relationship between activity of $RuO_2$loaded $CaIn_2O_4$ photo-catalyst at complete decomposition of water and loading concentration of Ru.

In FIG. 4, the dependency of Ru concentration which effects to the activity of photo-catalyst is indicated. The activity of photo-catalyst increases along with Ru concentration till 0.1 wt %, becomes almost constant at 1 wt % and slightly decreases at 2 wt %. From this phenomenon, it is understood that the optimum Ru concentration is 1 wt %.

Figure 5:
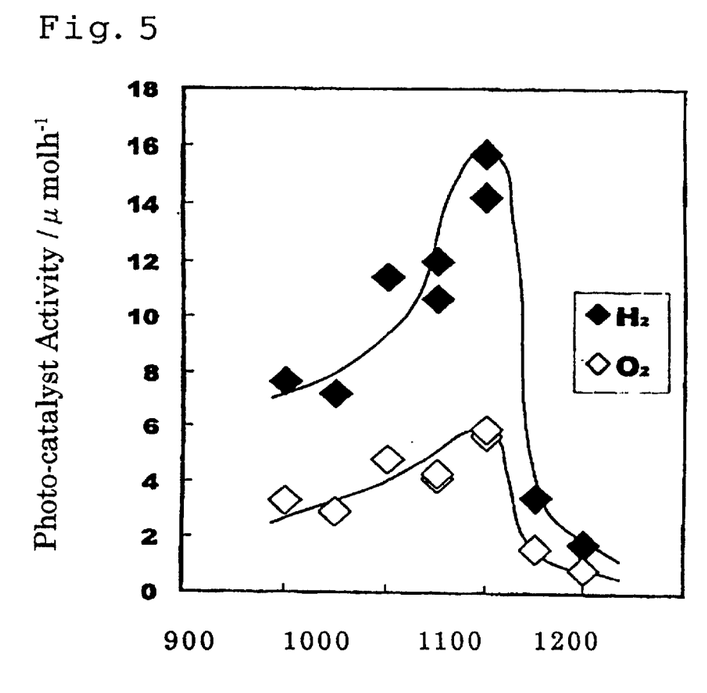
FIG. 5 is the graph showing the relationship of the calcination temperature and photo-catalyst activity at the preparation of coprecipitation powder calcined $CaIn_2O_4$.

FIG. 5 is the graph showing the relationship of the calcination temperature and photo-catalyst activity at the preparation of $CaIn_2O_4$. In a case of coprecipitation powder calcined $CaIn_2O_4$, when calcined by the temperature higher than 900° C., activity is generated and increases along with the elevation of calcined temperature, and most high activity can be obtained by calcined temperature from 1150° C. to 1200° C. From these results, it becomes clear that the optimum temperature for calcination is from 1150° C. to 1200° C.

Figure 6:
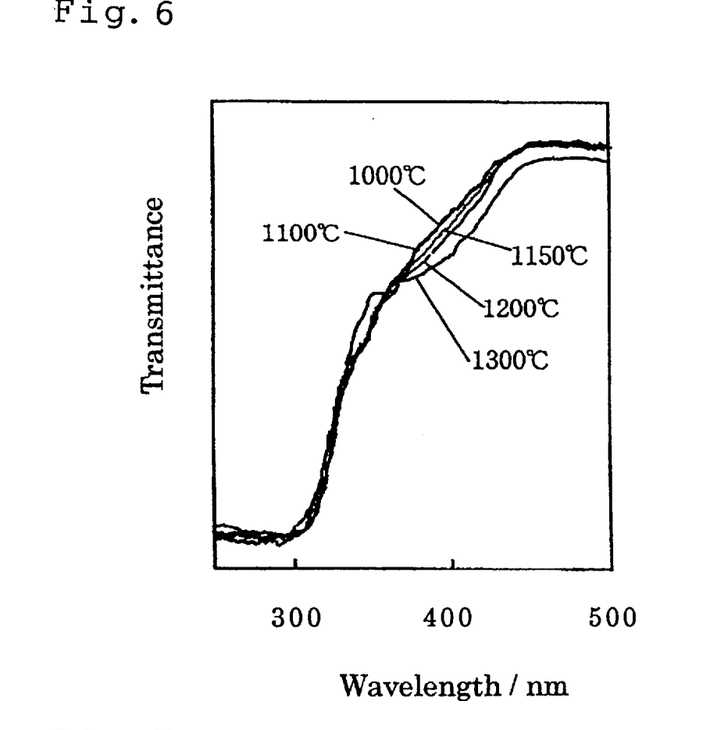
FIG. 6 is the graph showing the calcination temperature and the characteristics of diffusion reflection spectrum in the preparation method of $CaIn_2O_4$.

In FIG. 6, the diffusion reflection UV spectrum of alkali earth indate prepared by altering the temperature for calcination from 1000° C. to 1300° C. Photo absorption starts from approximately 450 nm, has a mild absorption peak at 400 nm, a sharp absorption peak at shorter wave length than 380 nm and indicates maximum absorption peak at 310 nm.

EXAMPLE 2

Photo-catalyst activity of $RuO_2$-loaded $SrIn_2O_4$ In an X-ray diffraction pattern of $SrIn_2O_4$ calcined by the temperature from 800° C. to 1200° C., the main peaks appear at $2\theta=18°$, $33°$, $35°$, $47°$ and $58°$, and the highest peaks appear at $2\theta=33°$ and $35°$. Within this calcination temperature limit, a diffraction pattern corresponding to the diffraction pattern described in JSPD card (33–1337) is obtained.

Figure 7:
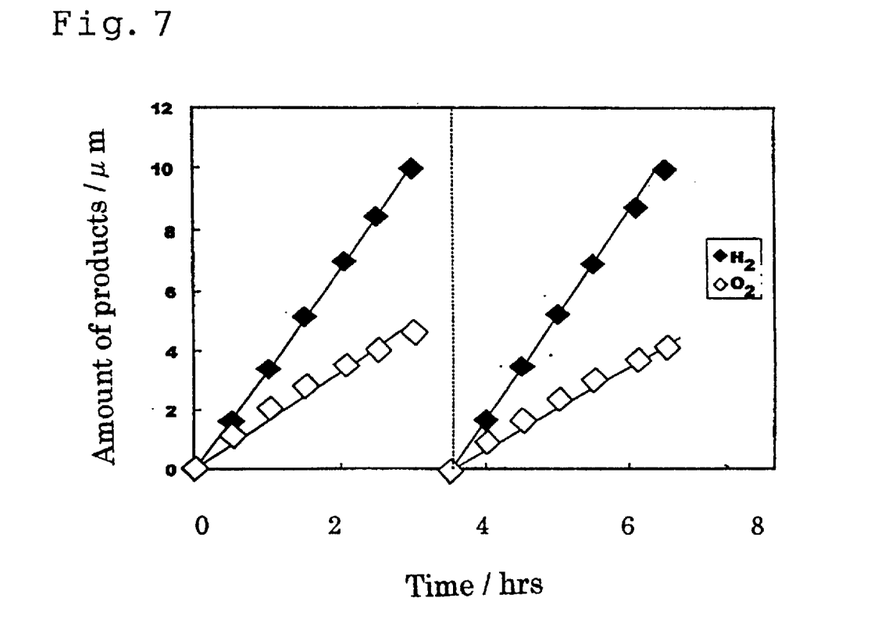
FIG. 7 is the graph showing the complete water decomposition characteristics of 1 wt % $RuO_2$-loaded $SrIn_2O_4$ photo-catalyst.

In FIG. 7, the variation by aging of photo-catalyst of $SrIn_2O_4$ loading 1 wt % of Ru by impregnation method using Ru carbonyl complex $Ru_3(CO)_{12}$ is indicated. Hydrogen and oxygen are generated. It is understood the initial catalyst activity is maintained after total reaction time of 8 hours.

Figure 8:
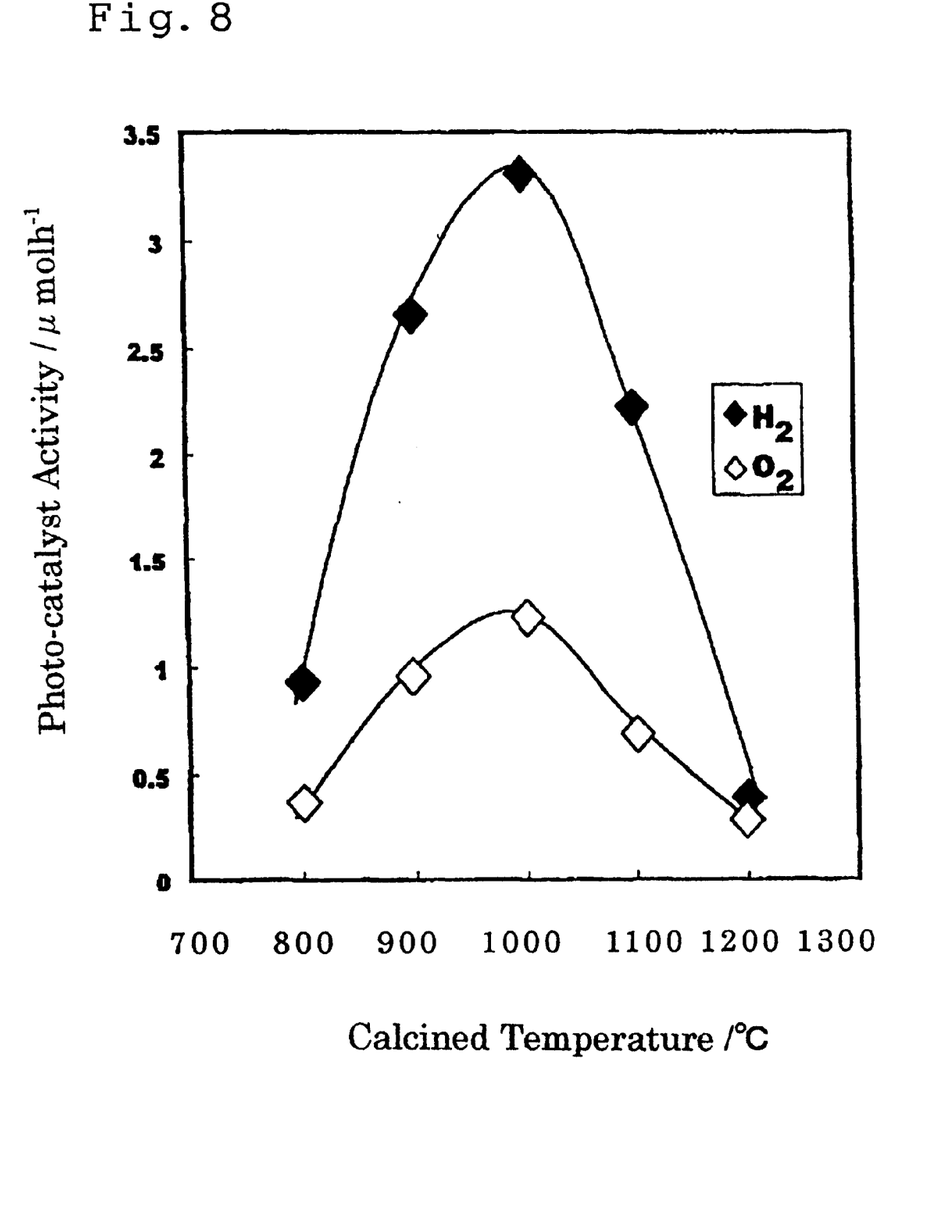
FIG. 8 is the graph showing the relationship of the calcination temperature and photo-catalyst activity at the preparation of $SrIn_2O_4$.

FIG. 8 indicates the relationship between calcination temperature and photo-catalyst activity at the preparation of $SrIn_2O_4$. The photo-catalyst activity increases along with the elevation of calcination temperature at the higher temperature than 800° C., indicates maximum activity at 1000° C., and decreases at the higher temperature than 1000° C. That is, it is understood that the optimum calcination temperature is 1000° C.

Figure 9:
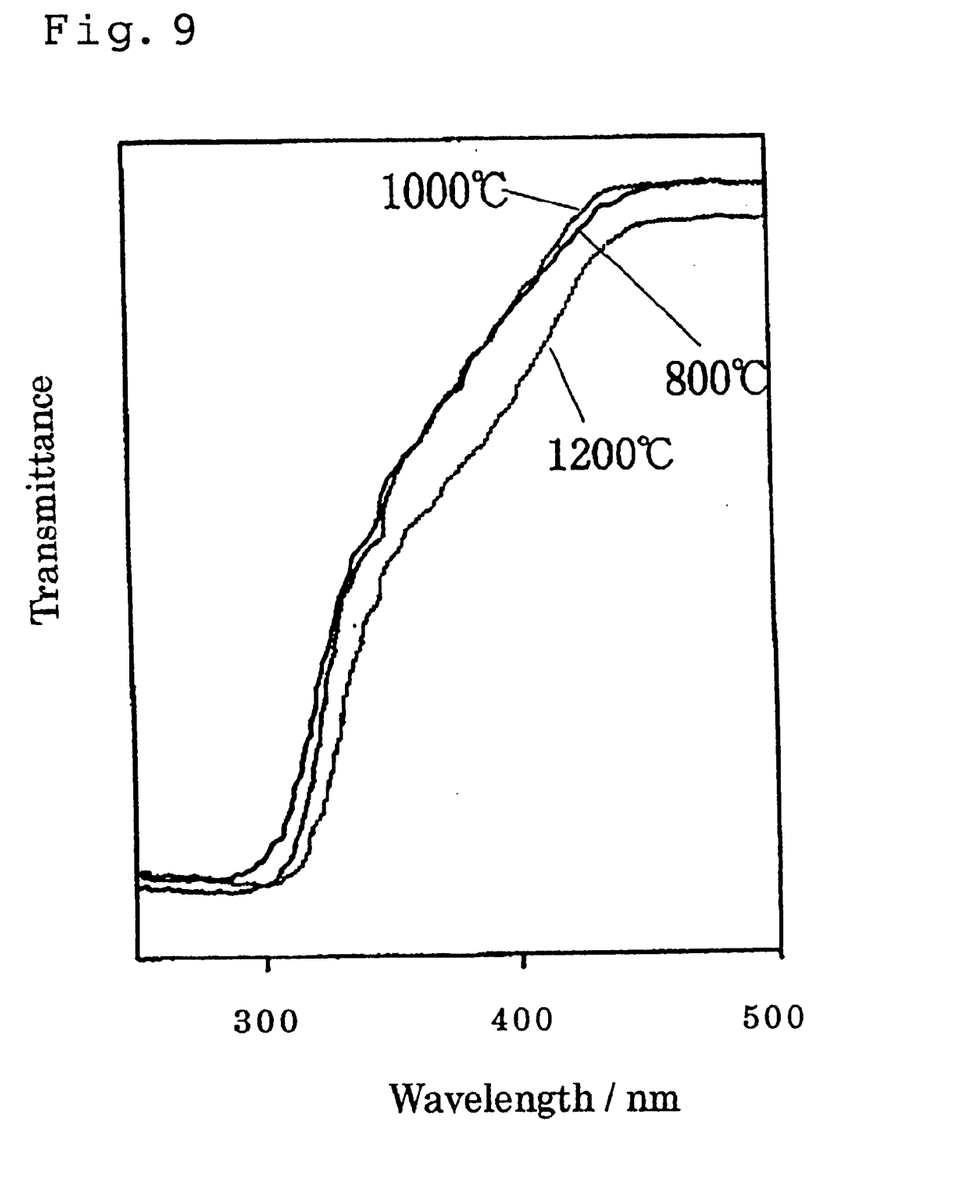
FIG. 9 is the graph showing the calcination temperature and the characteristics of diffusion reflection spectrum in the preparation method of $SrIn_2O_4$.

FIG. 9 indicates the diffusion reflection UV spectrum of $SrIn_2O_4$ prepared by altering the calcination temperature from 1000° C. to 1300° C. Photo absorption starts from approximately 450 nm, has a mild absorption peak at 400 nm, a sharp absorption peak at shorter wave length than 380 nm and indicates maximum absorption peak at 310 nm.

EXAMPLE 3

Figure 10:
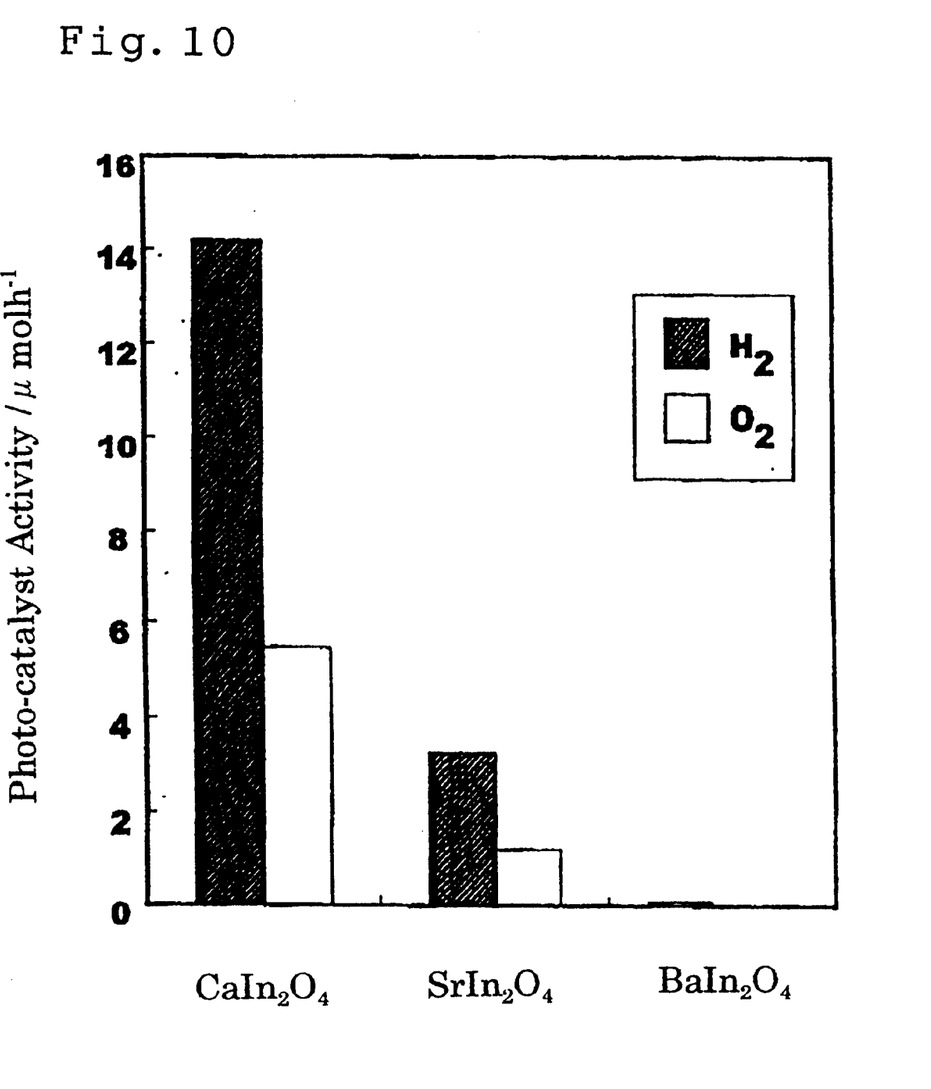
FIG. 10 is the graph showing the difference of effects of alkali earth elements to the photo-catalyst activity in regard to $RuO_2$-loaded $MIn_2O_4$ (M=Ca, Sr, Ba) photo-catalyst.

Effect of M ion to $RuO_2$-loaded $MIn_2O_4$ (M=Ca, Sr, Ba) photo-catalyst FIG. 10 indicates, activity of water photo decomposition of photo-catalysts when the kind of alkali earth element is changed. In a case of Ba, activity can not be observed, on the contrary, in a case of Sr, activity is generated and further activity can be observed in a case of Ca.

Figure 11:
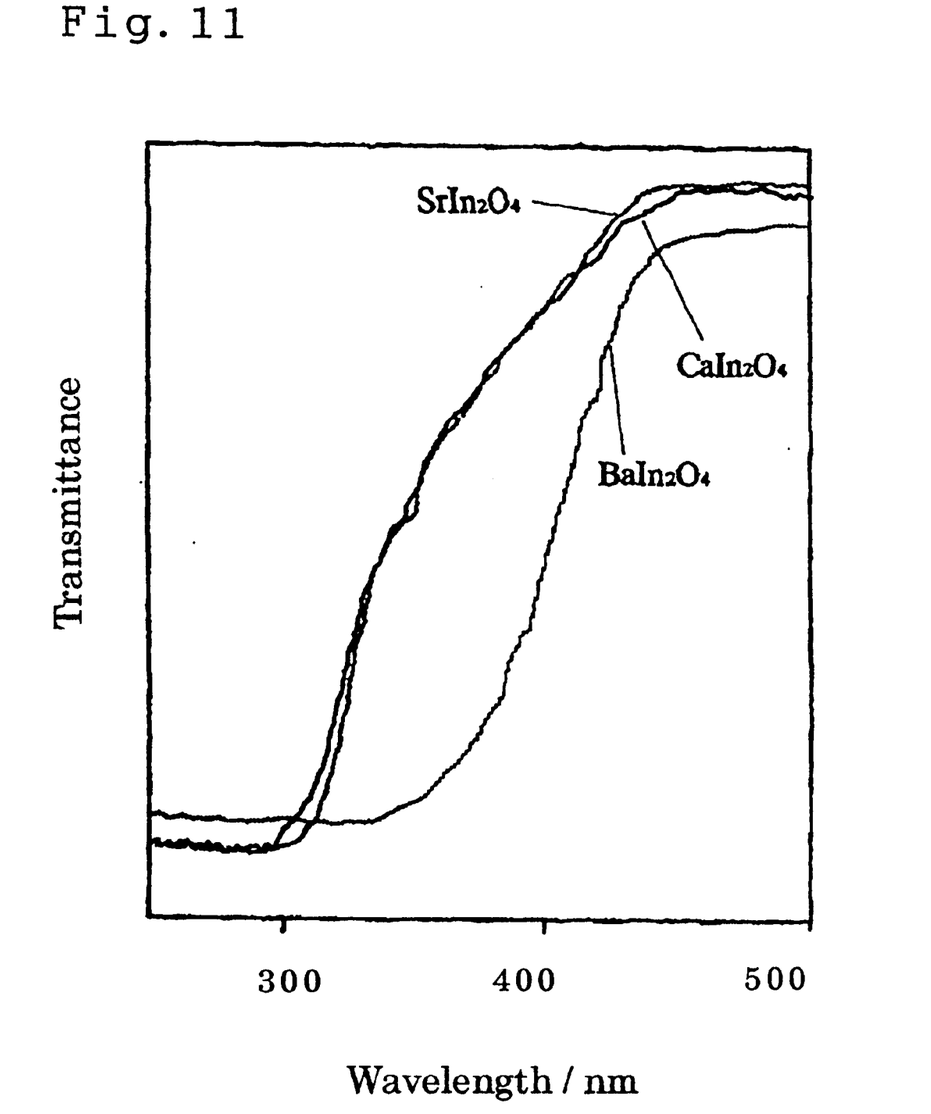
FIG. 11 is the graph showing the effects of alkali earth elements to the characteristics of diffusion reflection spectrum in regard to $MIn_2O_4$ (m=Ca, Sr, Ba).

FIG. 11 indicates the diffusion reflection UV spectrum of alkali earth indate $MIn_2O_4$ (M=Ca, Sr, Ba) when kind of alkali earth metal M is changed. In cases of Sr and Ca, photo absorption starts from approximately 450 nm, has a mild absorption peak at 400 nm, a sharp absorption peak at shorter wave length than 380 nm and indicates maximum absorption peak at 310 nm.

In the meanwhile, in a case of Ba, a remarkable absorption peak is observed at 440 nm, has a mild absorption peak at 400 nm and indicates maximum absorption peak at 350 nm.

EXAMPLE 4

Figure 12:
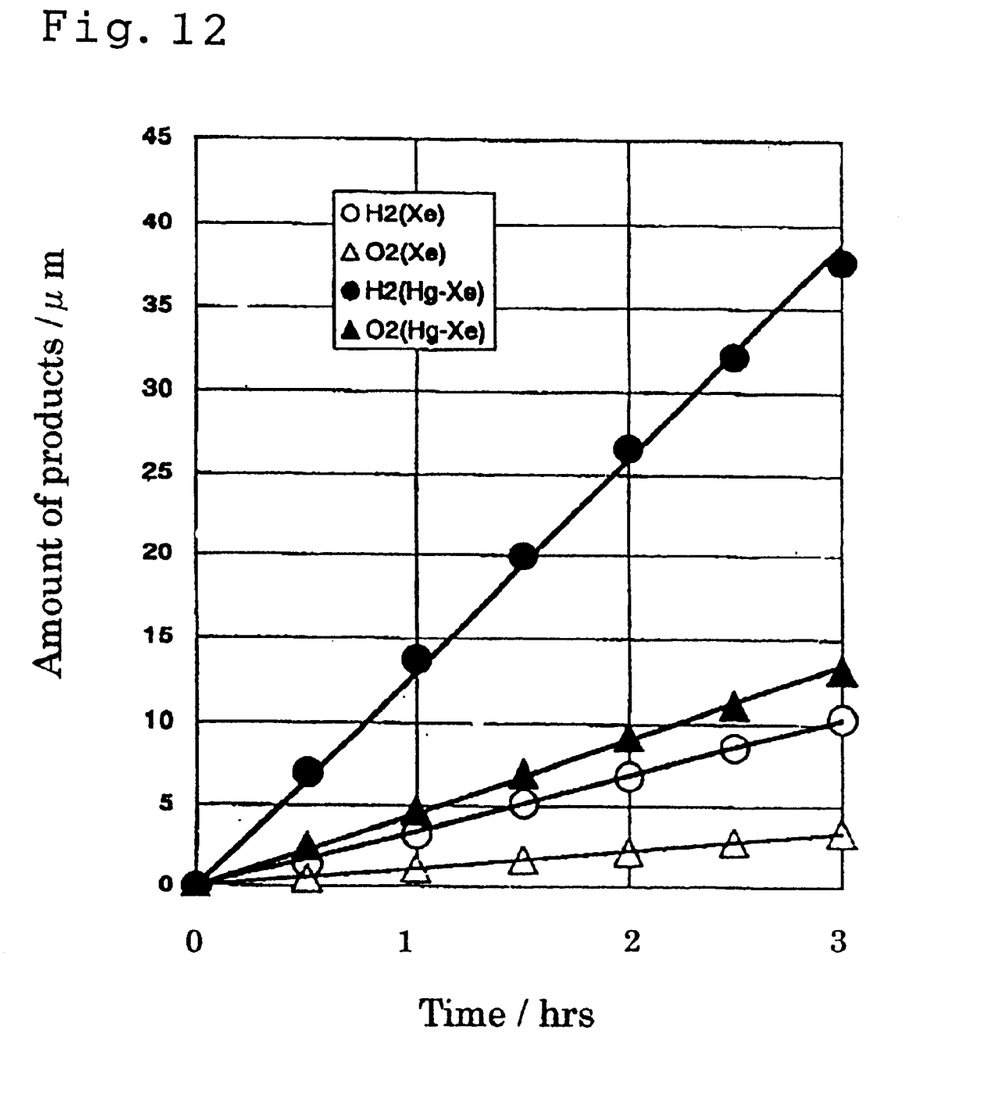
FIG. 12 is the graph showing the photo decomposition characteristics of water of $RuO_2$-loaded $ZnGa_2O_4$ photo-catalyst.

Photo-catalyst activity of $RuO_2$-loaded $MGa_2O_4$ $RuO_2$-loaded $ZnGa_2O_4$ is prepared according to the preparation method of photo active catalyst mentioned above. Water photo decomposition characteristics of $RuO_2$-loaded $ZnGa_2O_4$ photo-catalyst is shown in FIG. 12.

It is understood that water is completely decomposed to hydrogen and oxygen by this photo-catalyst.

EXAMPLE 5

Figure 13:
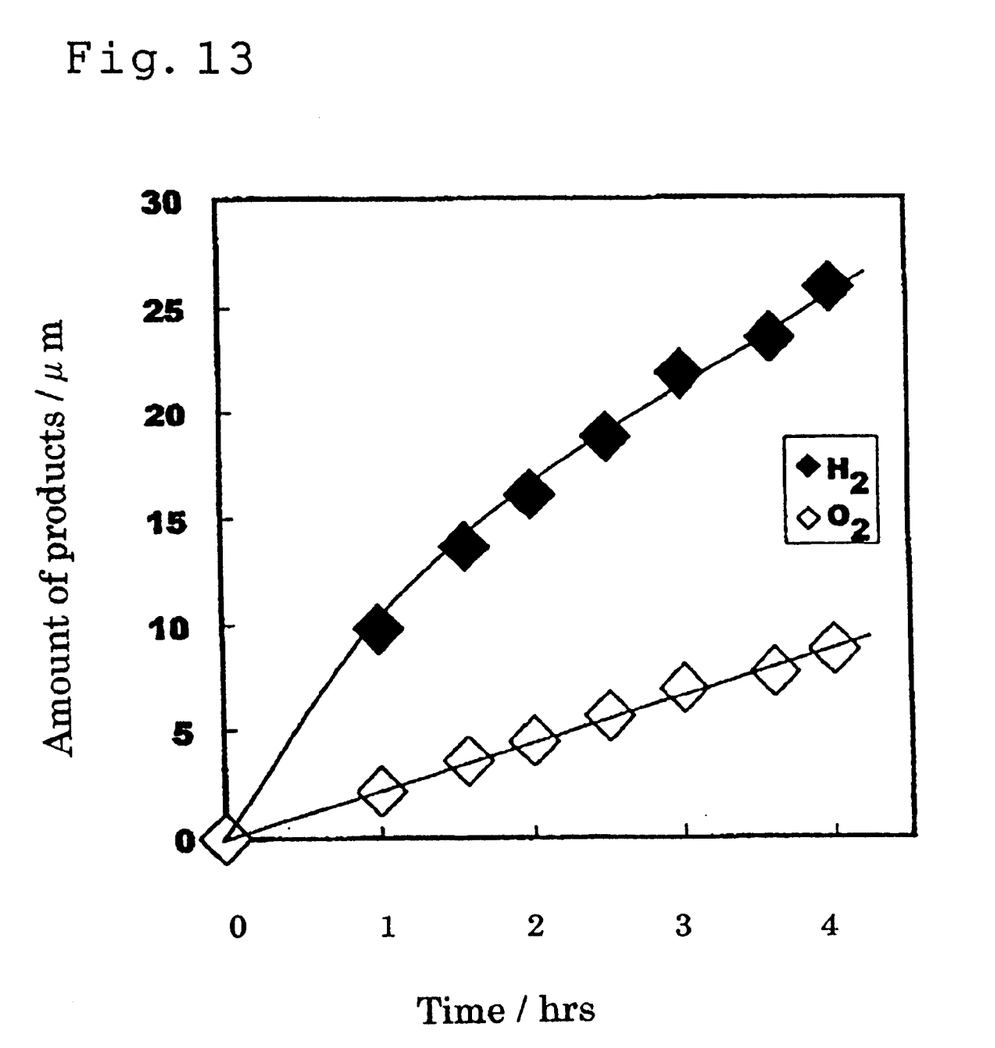
FIG. 13 is the graph showing the photo decomposition characteristics of water of $RuO_2$-loaded $Na_2Sb_2O_6$ photo-catalyst.

Photo-catalyst activity of antimonide salt $RuO_2$-loaded $Na_2Sb_2O_6$ $RuO_2$-loaded $Na_2Sb_2O_6$ is prepared according to the preparation method of photo active catalyst mentioned above. Water photo decomposition characteristics of $RuO_2$-loaded $Na_2Sb_2O_6$ photo-catalyst is shown in FIG. 13.

It is understood that water is completely decomposed to hydrogen and oxygen by this photo-catalyst.

Possibility for the Industrial Use

The photo-catalyst which carry out the complete photo decomposition reaction of water is usually limited to a metallic salt with $d^0$ configuration. In the present invention, it is found out that a metallic salt with $d^{10}$ configuration can be also used for the complete photo decomposition reaction of water. Therefore, it is obvious that the present invention contributes to the development of a novel catalyst for the complete photo decomposition of water.

What is claimed is:

1. A photo-catalyst comprising $RuO_2$-loaded $A_2X_nO_m$ or $RuO_2$-loaded $BX_nO_m$, wherein A is an alkali metal atom, B is an alkali earth metal atom or Zn, X is a metal ion with $d^{10}$ configuration, n=m/2 or n=m/3 and n is 2.

2. The photo-catalyst of claim 1, wherein $RuO_2$-loaded $A_2X_nO_m$ or $RuO_2$-loaded $BX_nO_m$ is obtained by a coprecipitation powder calcination method calcined at temperature of 1150 to 1200° C.

3. The photo-catalyst according to claim 2, wherein X is In, Ga or Sb, alkali metal atom is Na, K or Rb and alkali earth metal atom is Ca, Sr or Ba.

4. The photo-catalyst according to claim 1, wherein X is In, Ga or Sb, alkali metal atom is Na, K or Rb and alkali earth metal atom is Ca, Sr or Ba.

5. A powder composition yielding a complete photo-decomposition reaction of water comprising a photo-catalyst comprising $RuO_2$-loaded $A_2X_nO_m$ or $RuO_2$-loaded $BX_nO_m$, wherein A is an alkali metal atom, B is an alkali earth metal atom or Zn, X is a metal ion with $d^{10}$ configuration, n=m/2 or n=m/3 and n is 2.

6. The composition of claim 5 wherein the photo-catalyst is obtained by a coprecipitation powder calcination method calcined at a temperature of 1150 to 1200° C.

7. The composition of claim 5 wherein in the photo-catalyst X is In, Ga or Sb, alkali metal atom is Na, K or Rb and alkali earth metal atom is Ca, Sr or Ba.

* * * * *